United States Patent
Yen et al.

(10) Patent No.: US 10,716,187 B1
(45) Date of Patent: Jul. 14, 2020

(54) LED DRIVING STRUCTURE

(71) Applicant: GaN Power Technology Co., Ltd., Taichung (TW)

(72) Inventors: Tsung Hsien Yen, Taichung (TW); Hsing Yeh Wang, Taichung (TW); Feng Jui Shen, Changhua (TW)

(73) Assignee: GAN POWER TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 16/678,143

(22) Filed: Nov. 8, 2019

(51) Int. Cl.
*H05B 45/10* (2020.01)
*H05B 45/37* (2020.01)

(52) U.S. Cl.
CPC .................................... *H05B 45/37* (2020.01)

(58) Field of Classification Search
CPC ........ H05B 37/02; H05B 33/08; H05B 45/00; H05B 45/10; H05B 45/30; H05B 45/34; H05B 45/37; H05B 47/00; H05B 47/10; H05B 47/11
See application file for complete search history.

(56) References Cited

U.S. PATENT DOCUMENTS

2012/0249000 A1\* 10/2012 Kawai .................... H05B 45/10
315/200 R
2014/0176111 A1\* 6/2014 Kim ........................ G05F 1/613
323/311

\* cited by examiner

*Primary Examiner* — Jimmy T Vu
(74) *Attorney, Agent, or Firm* — Muncy, Geissler, Olds & Lowe, P.C.

(57) ABSTRACT

An LED driving structure includes an LED module, a power supply circuit, a voltage stabilizing circuit, a temperature compensation circuit and a gallium nitride field-effect transistor that are electrically connected. The power supply circuit is configured to supply a current to the LED module. The voltage stabilizing circuit includes a rectifying diode, a resistor and a Zener diode, and is connected to a gate of the gallium nitride field-effect transistor through the temperature compensation circuit for providing a stable voltage. The temperature compensation circuit includes at least one resistor, a thermistor and a transistor connected to the gate of the gallium nitride field-effect transistor for the LED module after being energized to maintain its power stably when there are voltage fluctuations and temperature fluctuations.

5 Claims, 1 Drawing Sheet

LED DRIVING STRUCTURE

FIELD OF THE INVENTION

The present invention relates to LEDs, and more particularly to an LED driving structure.

BACKGROUND OF THE INVENTION

Because light-emitting diodes have the advantages of high efficiency, long service life, not easy to break, fast response and high reliability, they are widely used for illumination as technology advances and production costs are reduced. In particular, high-voltage LEDs with high voltage and low current are widely used on the market. As to the high-voltage LED, an LED matrix is placed on a single wafer to provide a function of adjusting voltage and current. The LED light source achieves a single output light source effect due to a single wafer, which is used to improve the optical design, simplify the packaging process of the LED, and improve the luminous efficiency. However, high-voltage LEDs have strict requirements for voltage stability, especially switching elements in a driving circuit, namely, Metal-Oxide-Semiconductor Field-Effect Transistor (MOSFET). A new switching element, the gate of a gallium nitride field-effect transistor (GaNFET), is developed on the market. Although the GaNFET has higher efficiency, faster switching frequency and ultra-small package size, it requires relatively strict gate-source voltage drive. Therefore, the driving circuit of the conventional LED is provided with a voltage stabilizing circuit for stabilizing the operating voltage of the LED, thereby maintaining its power stably.

However, LEDs generate a large amount of thermal energy during operation to increase the temperature, and due to the nature of their semiconductor materials, voltage and power are reduced. Besides, in order to reduce the size, the high-voltage LED and the driving circuit are integrated on one circuit board. When the LED is turned on to illuminate, the heat generated by the LED will affect the electronic components of the driving circuit. However, if the influence of the heat generated by the LED lamp on the surrounding electronic components is not solved, the voltage stabilizing circuit is not enough to compensate for the attenuated power. As a result, the performance of the LED lamp is not good.

SUMMARY OF THE INVENTION

The primary object of the present invention is to provide an LED driving structure, which uses a voltage compensation circuit in a voltage stabilizing circuit to maintain a constant power of an LED when there are voltage fluctuations and temperature fluctuations, and prevents the power from decreasing due to the temperature generated by the LED to affect the electronic components of the circuit after the LED is energized to illuminate.

Another object of the present invention is to provide an LED driving structure, which uses a voltage compensation circuit in a voltage stabilizing circuit to provide a more stable voltage to a gate of a gallium nitride field-effect transistor to improve the working efficiency of the gallium nitride field-effect transistor, thereby allowing the LED to maintain a constant power.

In order to achieve the above objects, the present invention provides an LED driving structure. The LED driving structure comprises an LED module, a power supply circuit, a voltage stabilizing circuit, a temperature compensation circuit and a gallium nitride field-effect transistor that are electrically connected. The power supply circuit is configured to supply a current to the LED module. The voltage stabilizing circuit includes a rectifying diode, a resistor and a Zener diode, and is connected to the gallium nitride field-effect transistor through the temperature compensation circuit for providing a stable voltage. The temperature compensation circuit includes at least one resistor connected to the voltage stabilizing circuit, a thermistor and a transistor connected to a gate of the gallium nitride field-effect transistor for the LED module to maintain its power stably when heat is generated after being energized.

Preferably, the voltage stabilizing circuit further includes a capacitor.

Preferably, the LED module is fabricated by using chip-on-board technology.

In an embodiment, the LED module is a high-voltage LED for a vehicle.

BRIEF DESCRIPTION OF THE DRAWINGS

The Sole FIGURE is a circuit diagram of the present invention.

DETAILED DESCRIPTION OF THE PREFERRED EMBODIMENTS

Figure 1:
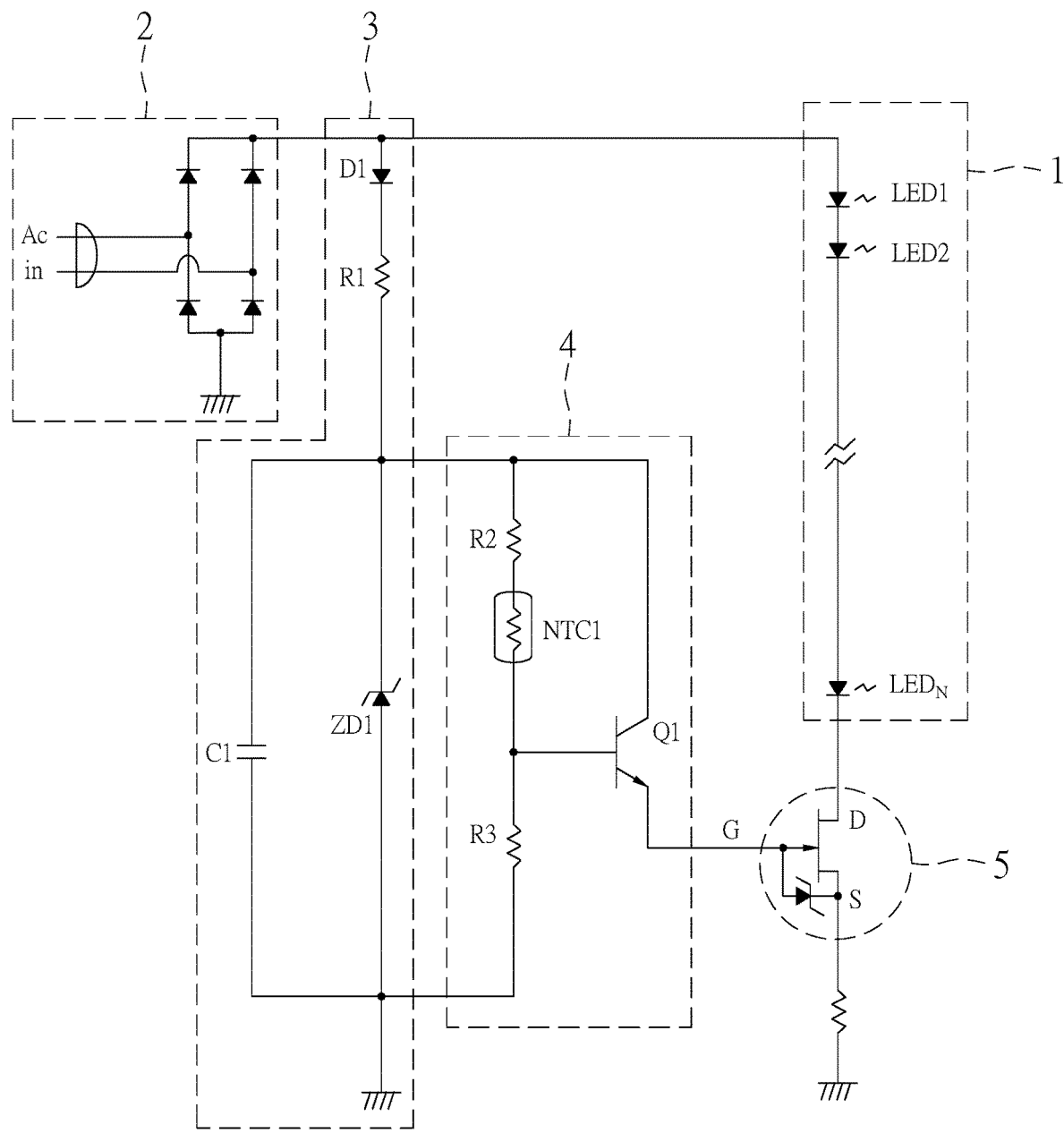

Embodiments of the present invention will now be described, by way of example only, with reference to the accompanying drawings.

Referring to the Sole FIGURE, an LED driving structure according to an embodiment of the present invention comprises an LED module 1, a power supply circuit 2, a voltage stabilizing circuit 3, a temperature compensation circuit 4 and a gallium nitride field-effect transistor (GaN FET) 5 that are electrically connected. In this embodiment, the LED module 1 is a high-voltage LED for a vehicle, and is fabricated by using chip-on-board (COB) technology.

The power supply circuit 2 includes a plurality of diodes for supplying a current to the LED module 1. In this embodiment, the power supply circuit 2 has a plurality of rectifying diodes for supplying a constant current to the LED module 1. The voltage stabilizing circuit 3 includes a rectifying diode D1, a resistor R1, a capacitor C1 and a Zener diode ZD1, and is connected to the gate of the gallium nitride field-effect transistor 5 for providing a stable voltage. The temperature compensation circuit 4 includes two resistors R2, R3 connected to the voltage stabilizing circuit 3, a thermistor NTC1, and a transistor Q1. The transistor Q1 is connected to the gate of the gallium nitride field-effect transistor 5 to compensate for the voltage when there is a change in temperature.

When the LED module 1 is energized, it generates thermal energy and raises the temperature. At this time, the voltage of the LED module 1 drops, and the on-resistance of the gallium nitride field-effect transistor 5 rises, causing the current to decrease. As a result, the overall power is decreased. However, with the above circuit configuration, after the temperature rises, the resistance value of the thermistor NTC1 decreases, and the voltage of the transistor Q1 and the gallium nitride field-effect transistor 5 rises, thereby increasing the current. Thereby, the operation efficiency of the LED module 1 can be maintained by offsetting the above-described attenuation due to heat.

The invention is characterized in that the temperature compensation circuit 4 makes the temperature change not cause voltage instability. The present invention not only provides a stable voltage to the LED module 1, but also the gallium nitride field-effect transistor 5 can drive the LED module 1 at a stable voltage.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An LED driving structure, comprising an LED module, a power supply circuit, a voltage stabilizing circuit, a temperature compensation circuit and a gallium nitride field-effect transistor that are electrically connected, wherein:
   the power supply circuit is configured to supply a current to the LED module;
   the voltage stabilizing circuit includes a rectifying diode, a resistor and a Zener diode, and is connected to a gate of the gallium nitride field-effect transistor through the temperature compensation circuit for providing a stable voltage;
   the temperature compensation circuit includes at least one resistor connected to the voltage stabilizing circuit, a thermistor and a transistor connected to the gate of the gallium nitride field-effect transistor to compensate for the voltage when there is a change in temperature, so that the LED module maintains power stably when heat is generated after being energized.

2. The LED driving structure as claimed in claim 1, wherein the voltage stabilizing circuit further includes a capacitor.

3. The LED driving structure as claimed in claim 1, wherein the power supply circuit has a plurality of rectifying diodes for supplying a constant current to the LED module.

4. The LED driving structure as claimed in claim 1, wherein the LED module is fabricated by using chip-on-board technology.

5. The LED driving structure as claimed in claim 1, wherein the LED module is a high-voltage LED for a vehicle.

\* \* \* \* \*